United States Patent [19]

Tuhro

[11] Patent Number: 4,471,386
[45] Date of Patent: Sep. 11, 1984

[54] METHOD AND APPARATUS FOR COMPOSING DOCUMENTS FOR SCANNING

[75] Inventor: Richard H. Tuhro, Webster, N.Y.

[73] Assignee: Xerox Corporation, Stamford, Conn.

[21] Appl. No.: 372,597

[22] Filed: Apr. 28, 1982

[51] Int. Cl.³ ............................................... H04N 7/12
[52] U.S. Cl. .................................... 358/280; 358/288; 358/293
[58] Field of Search ............... 358/257, 280, 288, 268, 358/293

[56] References Cited

U.S. PATENT DOCUMENTS 3,713,861  1/1973  Sharp .................................... 117/15
4,301,479  11/1981  Fukinaki et al. .................... 358/288

Primary Examiner—John C. Martin
Assistant Examiner—Edward L. Coles
Attorney, Agent, or Firm—Frederick E. McMullen

[57] ABSTRACT

A document scanning apparatus designed to faciliate composing, in which a retro-reflective material is used to delineate the borders of image areas on a document where scanning is not desired from image areas where scanning is desired. A control segregates image signals attributable to the retro-reflective material from image signals attributable to the document image and in response thereto discards those image signals derived from document image areas within the borders delineated by the retro-reflective material.

2 Claims, 4 Drawing Figures

METHOD AND APPARATUS FOR COMPOSING DOCUMENTS FOR SCANNING

The invention relates to raster input scanners, and more particularly to method and apparatus for delineating unscanned image areas on the document being scanned from scanned image areas.

When reproducing or copying a document original, it is often desired to avoid reproducing or copying certain portions of the document image. This tailoring or editing of the document reproduction or copy, which is referred to in the art as composing, may for example arise where it is desired to delete sensitive portions of a letter or report, or a portion of a drawing where a mistake has occurred to permit redrawing of the deleted area without the need for erasing or redoing the entire drawing, and so forth and so on.

With the more conventional reproduction machines and copiers, composing is usually done by cutting and pasting blank sheets atop the image areas to be deleted. This type of procedure is cumbersome and often results in a poor quality copy having image patterns of varying intensity identifying the portions of the original image that have been blanked out.

Electronic image processing systems where for example the document original is raster scanned and the document image converted to video image signals for later use in reproducing or making copies of the original document image hold promise for the future. While the older previously described masking arrangement would be effective in electronic image processing systems to distinguish image areas to be scanned from image areas not to be scanned, a simpler more sophisticated system for doing this seems desirable, particularly if the advantages in speed and reproduction of electronic systems is to be taken advantage of. By the same token, a super intelligent processing system that might be programmed to process only desired image areas may be quite complex in terms of operator usage and involvement. And, if it were desired to use various distinguishing color marks for composing purposes in electronic systems, special optics would be needed to assure that the mark would be recognized and distinguished from any other colored areas appearing in the original document image.

The invention is intended to avoid the limitations and difficulties of the past in segregating image areas from those to be reproduced or copied from those that are not and to provide economical electronic processing only of selected image areas of a document original, in which the steps comprise: delineating an area of a document where scanning is not desired from the area where scanning is desired by applying a retro-reflective material to the document to form a border marking the area not to be scanned; scanning the document line by line; converting the document images including images from the retro-reflective material to image signals; separating image signals derived from the reflective material from the image signals to provide control signals; and discarding image signals derived from scanning an image area within the border delineated by the reflective material in response to the control signals obtained.

The invention further relates to a document scanning apparatus comprising in combination: means for illuminating at least a line of the document; means for scanning the document line illuminated to provide image signals representative of the line; means for separating portions of the line not to be scanned from portions of the line to be scanned, the separating means consisting of a retro-reflective material applied to the document to form a border of the image area not to be scanned; means for identifying in the image signals derived by scanning the line signals attributable to the retro-reflective material; and means for discarding image signals output by said scanning means in response to the signals.

IN THE DRAWINGS

Figure 1:
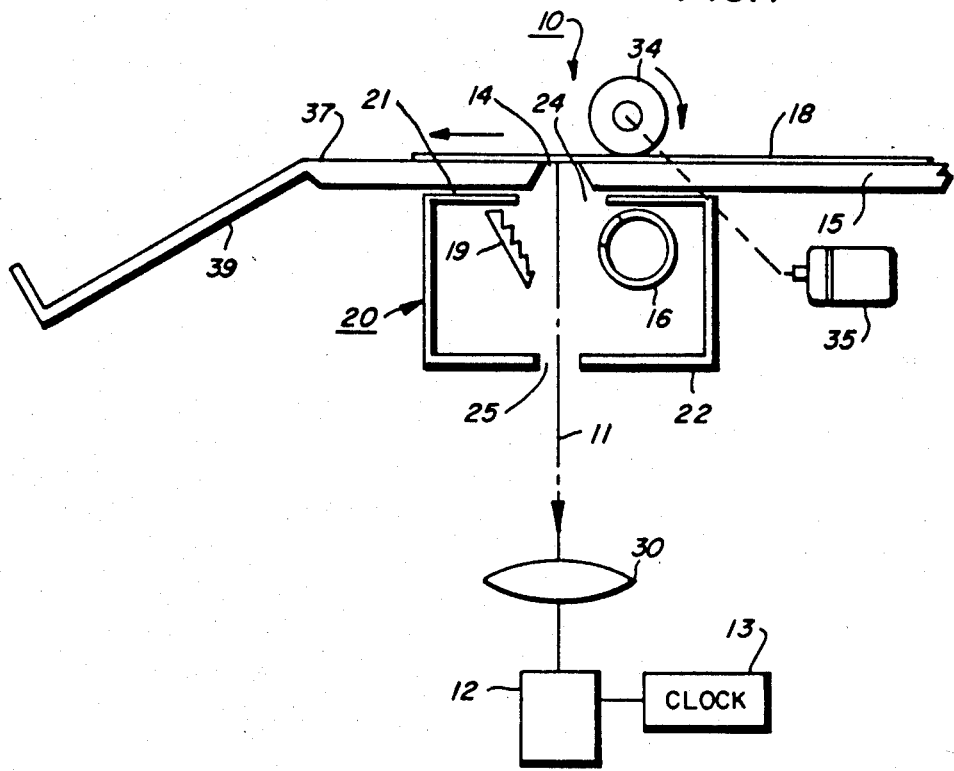
FIG. 1 is a schematic view of an exemplary document scanning apparatus embodying the principles of the present invention.

Referring particularly to FIG. 1, an exemplary scanning apparatus 10 embodying the principles of the present invention is thereshown. Scanning apparatus 10 includes a scanning array 12 disposed in preset spaced relation below an elongated document scanning slit 14 in document support member 15. Array 12 is operated by clock 13, clock 13 serving to provide integration, image signal transfer, and image signal output clocking pulses to array 12 in a manner understood by those skilled in the art. A lamp 16 is disposed below and to one side of scanning slit 14 and the optical path 11 to array 12 to illuminate the portion of document 18 being scanned opposite slit 14. To enhance illumination, a reflective surface 19 is disposed in preset relation to lamp 16 on the opposite side of the optical path 11. Lamp 16 and reflector 19 are preferably disposed within a housing 20, the upper and lower sides 21, 22 of which have slit-like apertures 24, 25 therein to accommodate the optical path 11. A suitable lens 30 is provided in the optical path 11 to focus light rays reflected from the portion of document 18 opposite scanning slit 14 onto array 12.

While a single array 12 is shown herein, it will be appreciated the multiple scanning arrays may be employed. In that event the arrays may be arranged so that the fields of view of the arrays overlap.

A document feed roll 34 is provided to advance the document 18 to be scanned across scanning slit 14. Feed roll 34 may be driven for example by step motor 35 which during scanning serves to step or index feed roll 34 to advance the document 18 being scanned past scanning slit 14 a line at a time.

Document support member 15 forms a substantially flat supporting surface 37 across which the document 18 being scanned is transported by feed roll 34. A catch tray 39 is provided downstream of scanning slit 14 to receive the documents. Documents to be scanned may be supplied to feed roll 34 by any suitable means, as for example, by hand.

In operation, successive line scans are made across the width of the document 18 being scanned by array 12 as the document is indexed or stepped across the scanning slit 14 by feed roll 34. As will be understood by those skilled in the art, the individual viewing elements that comprise array 12 are sampled successively as each line is scanned to produce a stream of image signals or pixels for each line scanned. The individual pixels produced each comprise a discrete voltage representation of the image area of document 18 viewed by the individual elements comprising array 12, the various voltage levels forming a relative measure of the image area gray scale.

One commercially available scanning array is a Fairchild 121-1728 pixel 2 phase linear array manufactured by Fairchild Manufacturing Company.

Figure 2:
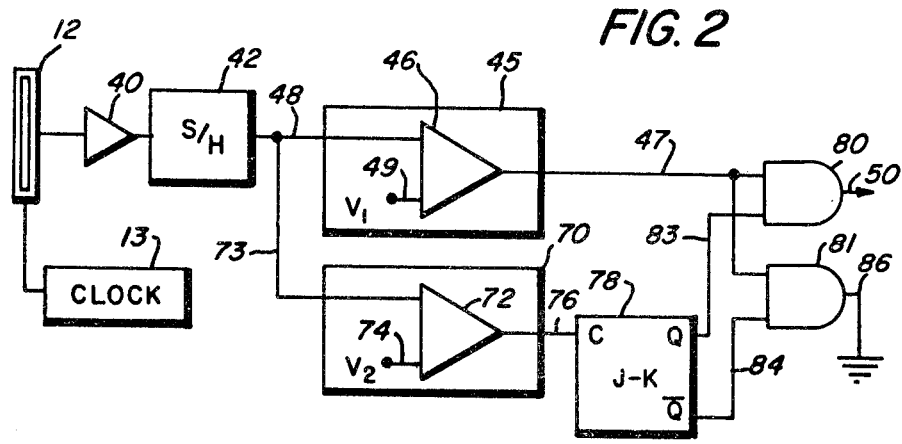
FIG. 2 is a circuit schematic view illustrating a control system for performing the present invention.
Figure 3:
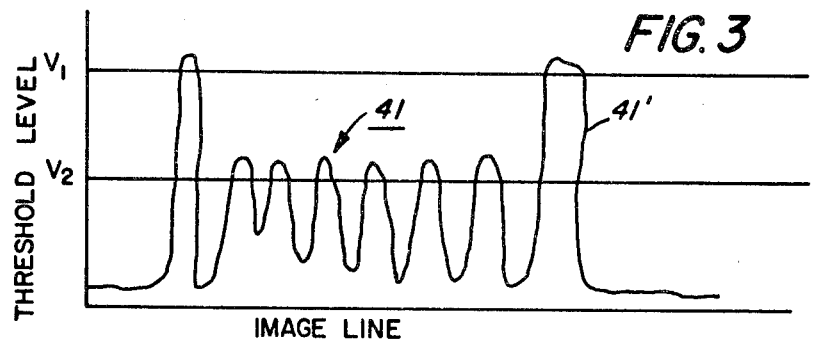
FIG. 3 is a plot of an exemplary image with threshold levels superimposed thereon.

Referring now particularly to FIGS. 2 and 3, the stream of image signals or pixels 41 output by array 12, following suitable pre-processing, exemplified herein by amplifier 40 and sample and hold circuit 42, pass to a suitable image signal processing means, shown here as a thresholding circuit 45 where the analog image signals from array 12 are thresholded. Thresholding circuit 45 includes a comparator 46, one input gate of which is coupled by line 48 to the output side of sample and hold circuit 42. A second input gate of comparator 46 is coupled by line 49 to a suitable reference or threshold potential $V_1$.

As will be understood by those skilled in the art, comparator 46 of thresholding circuit 45 compares the voltage signal level or potential of the image signals 41 from array 12 with the predetermined reference or thresholding potential ($V_1$) in line 49. Where the image signal potential is less than the threshold potential, a low (i.e. "0") image signal is output by comparator 46. Where the image signal potential is equal to or greater than the threshold potential, a high (i.e. "1") image signal is output.

As will appear, image signals are output by comparator 46 of thresholding circuit 45 through line 47 and gate 80 to an output line 50. As will be understood, line 50 may be coupled to any suitable image signal output device or user, such as a printer, memory, data communication channel, etc.

Figure 4:
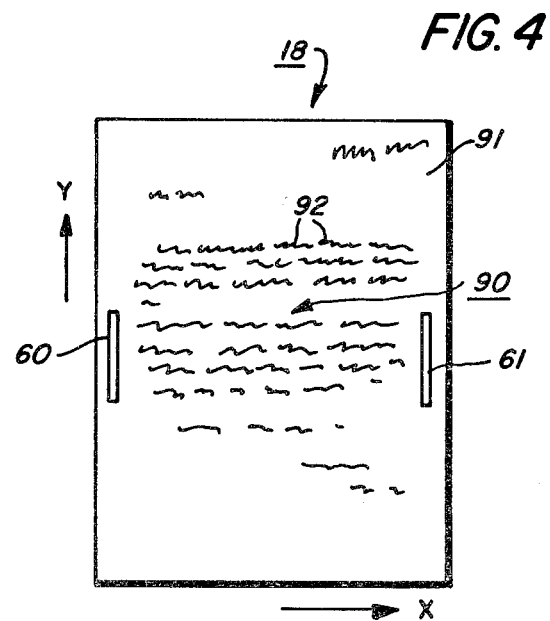
FIG. 4 is a view illustrating an exemplary document having an image area which is not to be scanned delineated by retro-reflective marks in accordance with the present invention.

Referring particularly to FIG. 4, it is often desirable to copy only certain selected portions of a document 18. Normally to do this, the area which is not to be copied (identified herein by the numeral 90), must be deleted or masked out, a relatively time consuming process which may result in destruction or defacing of the original document.

In the present invention, a pair of control marks 60, 61 which are preferably formed from a retro-reflective material, are instead used to separate the areas of the document 18 to be scanned from the areas of the document where scanning is not desired. Retro-reflective materials comprise any suitable material which when struck by light reflects a high percentage of the light, along substantially the path of the incident ray. This enables the retro-reflective mark to be distinguished from any reflections attributable to either the document material itself (i.e. background areas 91) or the document image (i.e. image areas 92). Typical reflective materials are retro-reflective ink, chalk, paint, paste, tape, etc. Commercially available retro-reflective materials are Scotchlite® brand reflective sheeting, and Scotchlite® reflective liquid (® Trademark of 3-M Corporation). Other retro-reflective materials may instead be readily envisioned as well as other highly reflective material types such as fluorescent paints, inks, etc.

To control scanning in response to the presence or absence of control marks 60, 61, and referring particularly to FIG. 2, a second thresholding circuit 70 is provided. Thresholding circuit 70 includes a comparator 72, one input gate of which is coupled to the output side of sample and hold circuit 42 by line 73. A second input gate of comparator 72 is coupled by line 74 to a suitable reference or threshold potential $V_2$. The output side of comparator 72 is connected by line 76 to the clock input terminal of control flip flop 78.

A pair of AND function gates 80, 81 are provided in the output of thresholding circuit 45, line 47 of circuit 45 being connected to one input terminal of each gate 80,81. The Q, $\overline{Q}$ output terminals of control flip flop 78 are coupled by lines 83,84 to a second input of gates 80,81 respectively. The output side of gate 80 is coupled to output line 50 while the output side of gate 81 is coupled by line 86 to a suitable image signal dump such as ground.

Operation

In operation, scanning of the document 18 is carried out by array 12 on a line by line basis, document 18 being advanced or indexed one line at a time by document feed roll 34 in the cross scan (i.e. y) direction. Array 12, which is driven by clock 13, scans the line-like portion of the document opposite scanning slit 14 in the scan (i.e. x) direction. In the exemplary arrangement shown, array 12 scans from left to right across the width of document 18 as shown by the x direction arrow in FIG. 4.

It will be understood that the scan direction may be reversed from that shown in FIG. 4, i.e. from right to left, or scanning may be conducted in a back and forth manner, i.e. from left to right, then right to left for the next line, then left to right for the next line, and so on.

Where it is desired to avoid scanning an area of the document 18, as for example the area 90 shown in the exemplary document 18 of FIG. 4, the boundaries of the area are delineated by applying a suitable retro-reflective material to the document to form control marks 60,61. Inasmuch as the document is scanned in the example shown along the x-axis by scanning array 12, the position of the marks 60, 61 determines the boundaries of the unscanned area 90 in the scan (i.e. x) direction while the axial length or height of the marks 60, 61 determines the boundaries of the unscanned area 90 in the cross scan (i.e. y) direction. Thus, in the example shown, line-like marks 60, 61 are made on either side of the area 90 from a point starting where the image deletion is to commence to a point where the image deletion is to end.

It is understood that where the retro-reflective material comprises a liquid, control marks 60, 61 may be made by brushing the retro-reflective material onto the document 18. Where the retro-reflective material comprises a marking element such as chalk, the marks 60, 61 may be drawn on by wiping the marking element against the document surface. Where the retro-reflective material comprises an appendage such as tape, the retro-reflective material is attached.

The dimension of control marks 60, 61 along the x axis need only be sufficient to meet the resolution parameter of the system.

Following marking of the document 18, the document is inserted image side down into the nip formed by document feed roll 34 and surface 15 for stepwise feeding thereof across scanning slit 14 by feed roll 34. In the absence of control marks 60, 61, the image signals ouput by array 12 are thresholded by thresholding circuit 45 and the processed video image signals output through gate 80 to output line 50. In this situation, the signal output of control flip flop 78 holds gate 80 enabled and gate 81 disabled.

As the first line of the area 90 reaches scanning slit 14, the line together with the marks 60, 61 are scanned by array 12. The relatively bright reflection from the retro-reflective material comprising control mark 60 causes array 12 to generate an abnormally high image signal 41' which when processed by thresholding circuit 70 generates a signal change in line 76 to reset control flip flop 78. Resetting of control flip flop 78 disables gate 80 while enabling gate 81. With enabling of gate 81, the video image signals output by thresholding circuit 45 are passed through gate 81 and line 86 and dumped to ground, and this portion of the line (up to the control mark 61) is in effect not read.

Similarly, control mark 61, which delineates the end of the image area in the line to be deleted, results in a high level signal input to thresholding circuit 70. The resulting change in signal in line 76 resets control flip flop 78 to again enable gate 80 and disable gate 81, thereby resuming output of image signals to line 50.

The foregoing process is repeated with each successive line that is scanned, the image signal output of thresholding circuit 45 which represents the image area between control marks 60, 61 being discarded while the remainder of the image signals are retained and output to line 50 and the image signal user.

While thresholder type image signal processing is shown and described, other signal processing arrangements may be used in lieu of or in addition to thresholding circuit 45.

While a pair of control marks 60, 61 whose position and extent define the boundaries of the area 90 which is not to be scanned are shown, other marking arrangements and configurations may be contemplated. For example, the area 90 may be delineated by a pair of relatively small spot type marks, one defining the start of the area 90 and the other the end of the area 90. And in the case where the area 90 comprises an already separated portion of the document such as a paragraph, the control marks may be placed in the space that normally separates one paragraph from another at any point along the scan axis X.

While a pair of control marks 60, 61 have been described, a single control mark (i.e. 60) defining the start of the area which is not to be scanned may instead be envisioned with the End of Scan (EOS) signal normally associated with scanning apparatus of the type shown being relied upon to define the end of the area 90.

While the invention has been described with reference to the structure disclosed, it is not confined to the details set forth, but is intended to cover such modifications or changes as may come within the scope of the following claims.

I claim:

1. The method of scanning selected areas of an original image to the exclusion of other areas, comprising the steps of:
    (a) delineating any area of said original image where scanning is not desired from the remainder of said original image by marking the borders of said area not to be scanned with a retro-reflective material;
    (b) scanning the document line by line to produce a stream of signals comprised of image signals representative of said original image and border signals representative of said retro reflective material;
    (c) thresholding said signals against a first predetermined reference signal to output said image signals;
    (d) thresholding said signals against a second predetermined reference signal to distinguish said image signals from said border signals, the signal levl of said second reference signal being greater than the maximum level of said image signals but less than the maximum level of said border signals;
    (e) generating a scan stop control signal in response to detection of a first border signal;
    (f) generating a scan restart control signal in response to detection of a second border signal;
    (g) discarding image signals in said stream of signals in response to said scan stop control signal; and
    (h) resuming output of said image signals in response to said scan restart control signal whereby scanning of the image area within the borders marked by said retro-reflective material is avoided.

2. The method according to claim 1 including the step of:
    comparing said signals with said first and second reference signals simultaneously.

* * * * *